(12) United States Patent
Raemsch (10) Patent No.: US 9,308,853 B2
(45) Date of Patent: Apr. 12, 2016

(54) CONVERTIBLE TRAILER AND ATTACHMENTS

(71) Applicant: Chad Aaron Raemsch, Lockhart, TX (US)

(72) Inventor: Chad Aaron Raemsch, Lockhart, TX (US)

(*) Notice: Subject to any disclaimer, the term of this patent is extended or adjusted under 35 U.S.C. 154(b) by 0 days.

(21) Appl. No.: 14/169,978

(22) Filed: Jan. 31, 2014

(65) Prior Publication Data

US 2014/0217701 A1 Aug. 7, 2014

Related U.S. Application Data

(60) Provisional application No. 61/759,836, filed on Feb. 1, 2013, provisional application No. 61/761,497, filed on Feb. 6, 2013.

(51) Int. Cl.
| | |
|---|---|
| *B62D 53/06* | (2006.01) |
| *B60P 3/42* | (2006.01) |
| *B62D 33/077* | (2006.01) |
| *B62D 63/06* | (2006.01) |

(52) U.S. Cl.
CPC ............ *B60P 3/42* (2013.01); *B62D 33/077* (2013.01); *B62D 53/061* (2013.01); *B62D 63/06* (2013.01)

(58) Field of Classification Search
CPC .............................. B60D 1/52; B60P 1/6427
USPC ...................................... 280/415.1; 414/495
See application file for complete search history.

(56) References Cited

U.S. PATENT DOCUMENTS

| | | | | | |
|---|---|---|---|---|---|
| 3,071,264 | A | * | 1/1963 | Totaro et al. | 414/494 |
| 3,724,695 | A | * | 4/1973 | Taylor | 414/484 |
| 4,836,735 | A | * | 6/1989 | Dennehy et al. | 414/475 |
| 5,163,800 | A | * | 11/1992 | Raisio | 414/500 |
| 5,803,699 | A | * | 9/1998 | Pinkston | 414/498 |
| 2007/0189886 | A1 | * | 8/2007 | Chaddock | 414/498 |
| 2009/0035116 | A1 | * | 2/2009 | Johnson et al. | 414/631 |
| 2010/0215466 | A1 | * | 8/2010 | Cline | 414/495 |
| 2013/0149087 | A1 | * | 6/2013 | Jones | 414/491 |

* cited by examiner

*Primary Examiner* — Joseph Rocca
*Assistant Examiner* — Marlon Arce
(74) *Attorney, Agent, or Firm* — Meyertons, Hood, Kivlin, Kowert & Goetzel, P.C.; Eric B. Meyertons (57) ABSTRACT

In some embodiments, a convertible platform system may include a platform, a first platform attachment, and a second platform attachment. The platform may include a first side at least two wheels, a loading system, and a coupling system. The first platform attachment may include a first surface which couples, during use, to the first side of the platform. The first platform attachment may include a first function. The second platform attachment may include a second surface which couples, during use, to the first side of the platform. The second platform attachment may include a second function. The loading system may couple to a first end of at least one of the platform attachments and convey the platform attachment from a first unloaded position to a second loaded position. The coupling system may couple during use either the first platform attachment or the second platform attachment to the first side of the platform.

16 Claims, 10 Drawing Sheets

CONVERTIBLE TRAILER AND ATTACHMENTS

PRIORITY CLAIM

This application claims priority to U.S. Provisional Patent Application No. 61/759,836 entitled "CONVERTIBLE TRAILER AND ATTACHMENTS" filed on Feb. 1, 2013, and U.S. Provisional Patent Application No. 61/761,497 entitled "CONVERTIBLE TRAILER AND ATTACHMENTS" filed on Feb. 6, 2013, all of which are incorporated by reference herein.

BACKGROUND OF THE INVENTION

1. Field of the Invention

The present disclosure generally relates to trailer systems and methods of transporting different types of cargo. More particularly, the disclosure generally relates to convertible trailers for transporting various types of cargo.

2. Description of the Relevant Art

There are a number of different types of trailers in existence today. There exist specialized trailers for any number of different uses. Therein lies one of the problems associated with the large number of different trailers. It is not uncommon for individuals and/or businesses to require the use of more than one type of trailer.

The problem with requiring several different types of trailers is that in general trailers are very expensive to purchase and to maintain and service. The initial cost of purchasing a trailer may run from several thousand dollars at the low end to at least many tens of thousands of dollars on the high end. Typically costs being associated with how specialized the trailer is as well as how large the trailer is.

Not to be discounted are costs associated with maintaining trailers and how that is magnified if one needs to maintain multiple trailers. Common maintenance costs may include replacing tires, licensing (depending on local and federal codes), upkeep of electrical components, hydraulics, brakes, storage of the trailer, etc.

Therefore a convertible trailer system and/or method which would reduce the initial purchasing costs for a user requiring several different types of trailers, as well as reducing the maintenance costs would be highly desirable.

SUMMARY

This disclosure describes systems and methods related to, in some embodiments, a convertible platform system. The convertible platform system may include a platform, a first platform attachment, and a second platform attachment. The platform may include a first side, at least two wheels, a loading system, and a coupling system. The wheels may be coupled to a second side, opposite the first side, of the platform. The first platform attachment may include a first surface which couples, during use, to the first side of the platform. The first platform attachment may include a first function. The second platform attachment may include a second surface which couples, during use, to the first side of the platform. The second platform attachment may include a second function. The first function and the second function may be different. The loading system may couple to a first end of at least one of the platform attachments and convey the platform attachment from a first unloaded position to a second loaded position. The coupling system may couple during use as necessary either the first platform attachment or the second platform attachment to the first side of the platform. In some embodiments, platform attachments may be coupled to a commercial truck or semi including a loading system (e.g., winch/hydraulic or hydraulic hooklift system) as opposed to coupling platform attachments to a platform or at least wherein the platform is formed as part of automobile.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

Figure 1A:
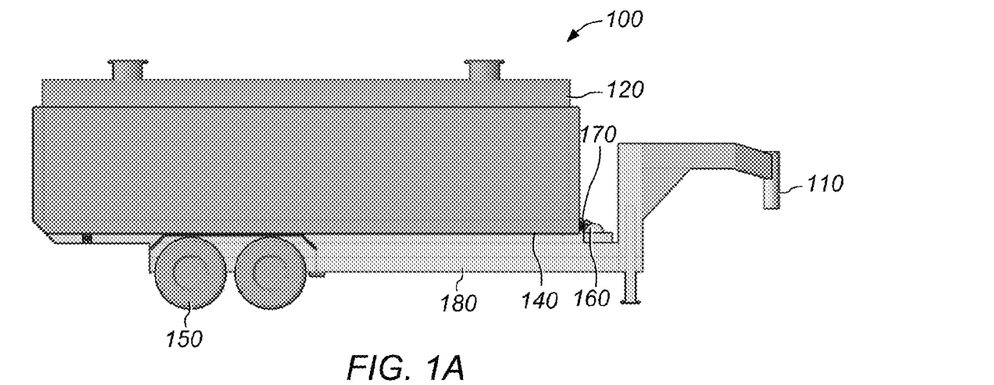
FIGS. 1A-B depict a diagram of a view of an embodiment of a convertible trailer system with an embodiment of a first trailer attachment coupled to a trailer.
Figure 1B:
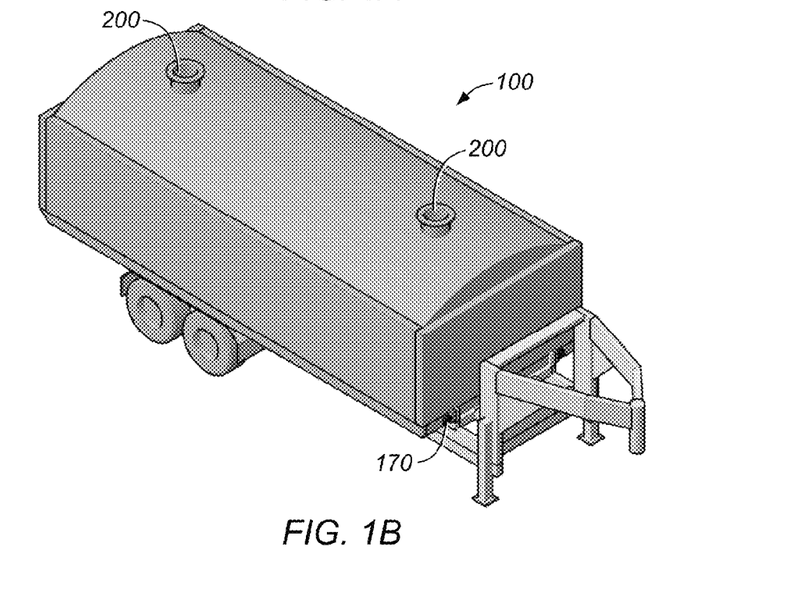

This disclosure describes systems and methods related to, in some embodiments, a convertible platform (e.g., trailer) system. Convertible trailer system 100 may include trailer 110, first trailer attachment 120, and second trailer attachment 130. FIGS. 1A-B depict a diagram of a view of an embodiment of a convertible trailer system 100 with an embodiment of first trailer attachment 120 coupled to trailer 110. The trailer may include first side 140, at least two wheels 150, loading system 160, and coupling system 170. The wheels may be coupled to second side 180, opposite the first side, of the trailer.

Figure 2:
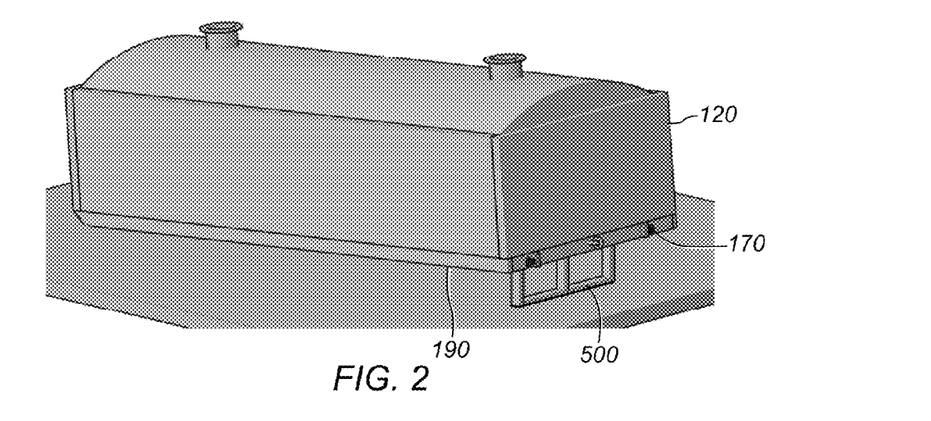
FIG. 2 depicts a diagram of a view of an embodiment of a first trailer attachment which functions to transport, for example, liquids such as fuel or water.

FIG. 2 depicts a diagram of a view of an embodiment of first trailer attachment 120 which functions to transport, for example, liquids such as fuel or water. The first trailer attachment may include a first surface 190 which couples, during use, to the first side of the trailer. The first trailer attachment may include a first function, in the embodiment depicted in FIG. 2 the first function is that of containing goods for transport. In the particular embodiment depicted in FIG. 2 the first trailer attachment may function to transport liquid materials (e.g., fuel, water). The first trailer attachment depicted functions to contain anything which may be positioned within the confines of the first trailer attachment and pass through openings 200 depicted. Other embodiments may include larger openings or openings positioned more advantageously to load/unload cargo such that most commonly transported good might be transported using the first trailer attachment. A guiding system, as described herein below, may elevate an end portion of a trailer attachment when the trailer attachment is off loaded from the trailer such that gravity may assist in unloading or discharging any cargo (e.g., liquid cargo, or any type of solid cargo as well).

Figure 3A:
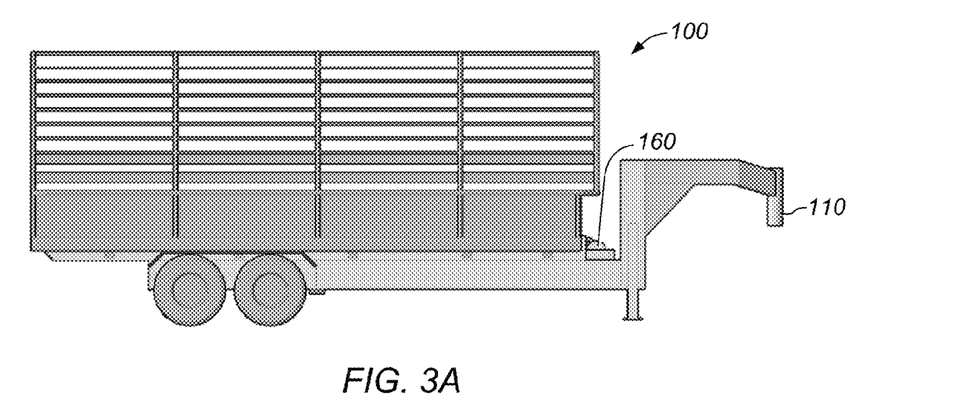
FIGS. 3A-B depict a diagram of a view of an embodiment of a convertible trailer system with an embodiment of a second trailer attachment coupled to a trailer.
Figure 3B:
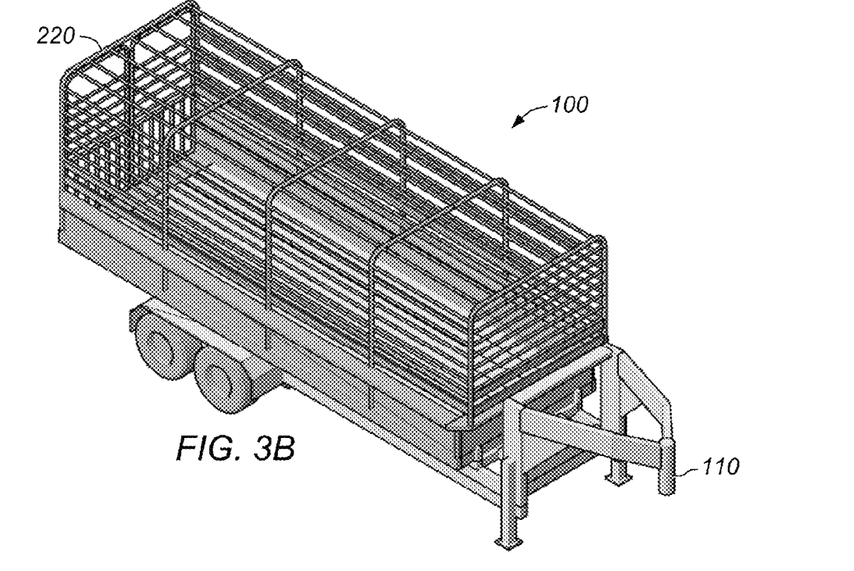
Figure 4:
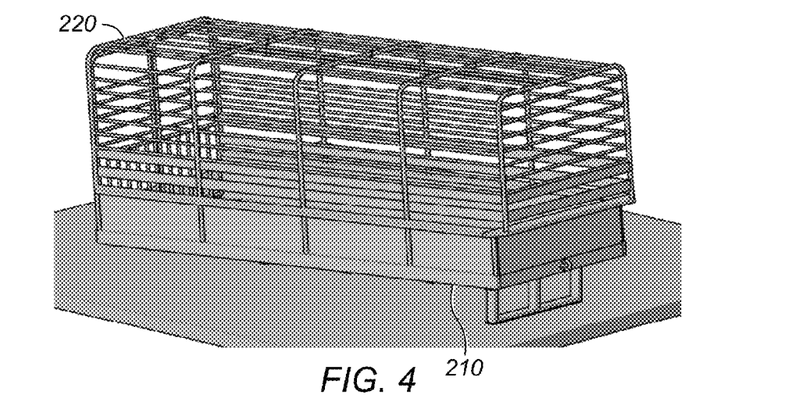
FIG. 4 depicts a diagram of a view of an embodiment of a second trailer attachment which functions to transport, for example, livestock.

FIGS. 3A-B depict a diagram of a view of an embodiment of convertible trailer system 100 with an embodiment of second trailer attachment 130 coupled to a trailer 110. FIG. 4 depicts a diagram of a view of an embodiment of second trailer attachment 130 which functions to transport, for example, livestock. Second trailer attachment 130 may include second surface 210 which couples, during use, to the first side of the trailer. The second trailer attachment may include a second function. In some embodiments, the first function and the second function may be different. The second trailer attachment may function to contain live animals for transport. Live animals may include any number of common livestock (e.g., cattle, sheep, goats) which need to be transported for various reasons, including, but not limited to, conveying the livestock to market, a buyer, slaughterhouse, etc. In some embodiments, the one or more sides of the second trailer attachment may be formed by elongated members (e.g., bars) coupled together such that the livestock are contained while still allowing the livestock access to fresh air and light during transport. The second transport may also include one or more gates 220 which function to contain livestock, once loaded, in the second trailer attachment. Different embodiments, of such a livestock transport, are included within the scope of what is described herein.

The first and second trailer attachments are only two embodiments of different types of trailer attachments which may be coupled to the trailer. Any type of trailer may be adapted to function as a trailer attachment which is couplable to the trailer. Some further embodiments of trailer attachments, by way of example, are now described. Any of the trailer attachments described may be referred to as the first and/or second trailer attachment.

Figure 5A:
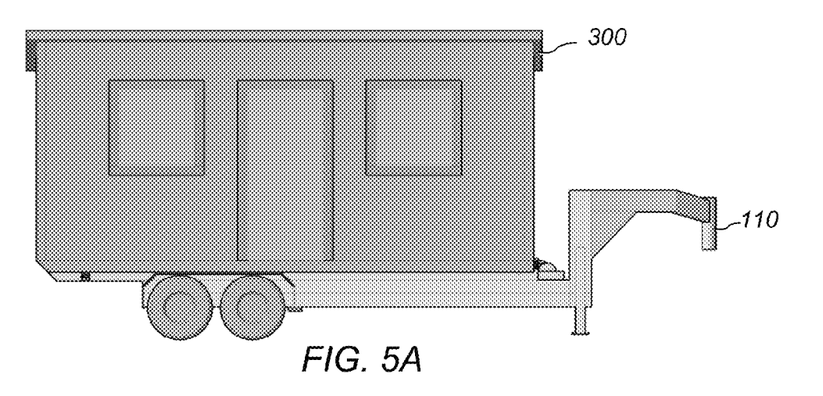
FIGS. 5A-B depict a diagram of a view of an embodiment of a convertible trailer system with an embodiment of a trailer attachment coupled to a trailer.
Figure 5B:
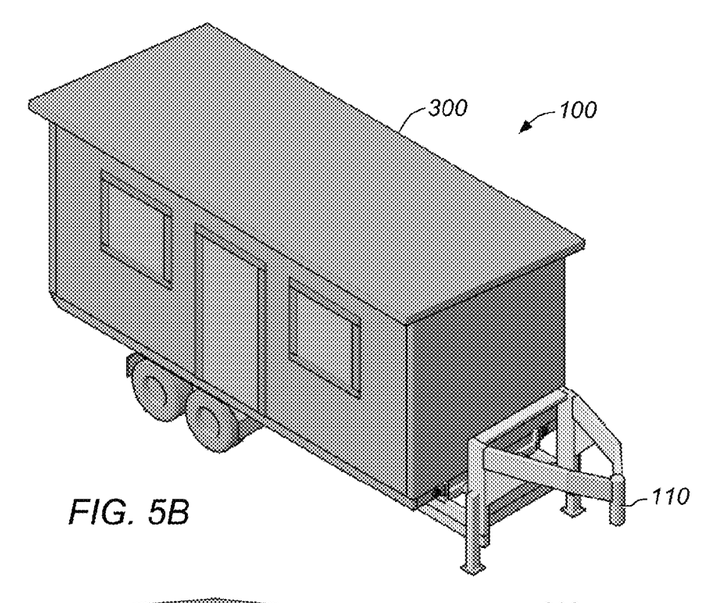
Figure 6:
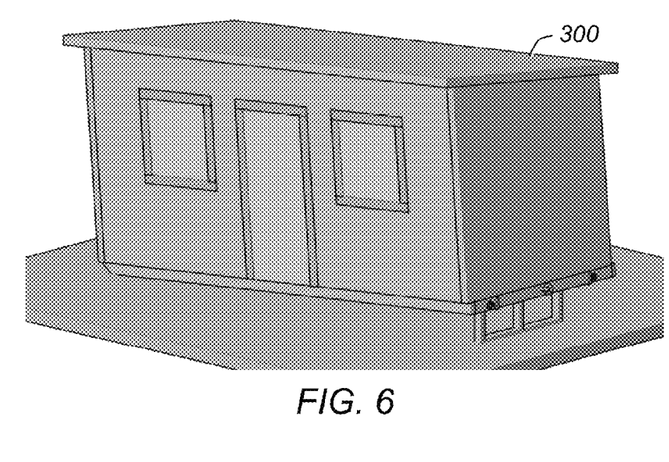
FIG. 6 depicts a diagram of a view of an embodiment of a trailer attachment which functions as a transportable dwelling.

FIGS. 5A-B depict a diagram of a view of an embodiment of convertible trailer system 100 with an embodiment of trailer attachment 300 coupled to a trailer 110. FIG. 6 depicts a diagram of a view of an embodiment of trailer attachment 300 which functions as a transportable dwelling. The transportable dwelling may be used in several different fashions during use. The transportable dwelling may be used as a transportable office (e.g., for on site management purposes such as at construction sites), a movable home (for example, similar to a recreation vehicle ("RV")), a movable hunting blind, and/or a movable storage building.

Figure 7A:
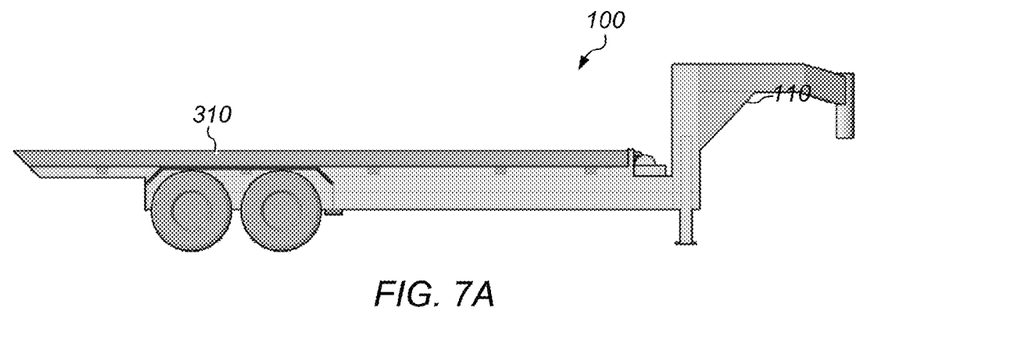
FIGS. 7A-B depict a diagram of a view of an embodiment of a convertible trailer system with an embodiment of a trailer attachment coupled to a trailer.
Figure 7B:
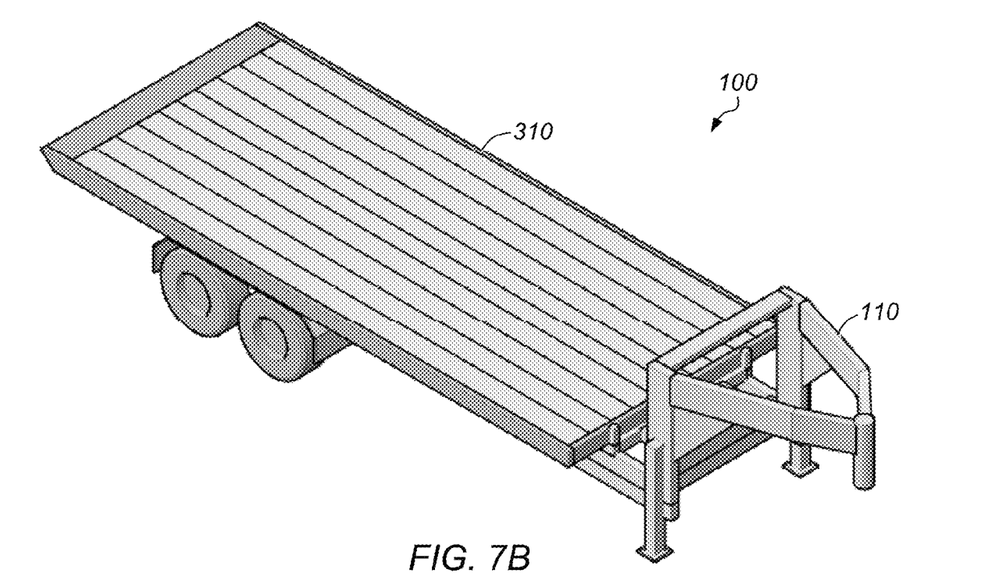
Figure 8:
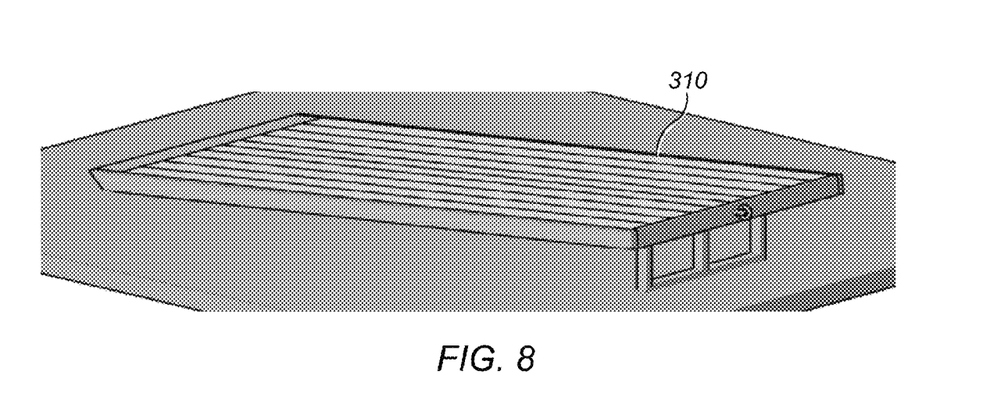
FIG. 8 depicts a diagram of a view of an embodiment of a trailer attachment which functions as a flatbed cargo transport.

FIGS. 7A-B depict a diagram of a view of an embodiment of convertible trailer system 100 with an embodiment of trailer attachment 310 coupled to trailer 110. FIG. 8 depicts a diagram of a view of an embodiment of trailer attachment 310 which functions as a flatbed cargo transport. Trailer attachment 310 may function to transport common types of cargo which are typically conveyed using a flatbed cargo trailer. The trailer attachment may include tie downs for securing cargo.

Figure 9A:
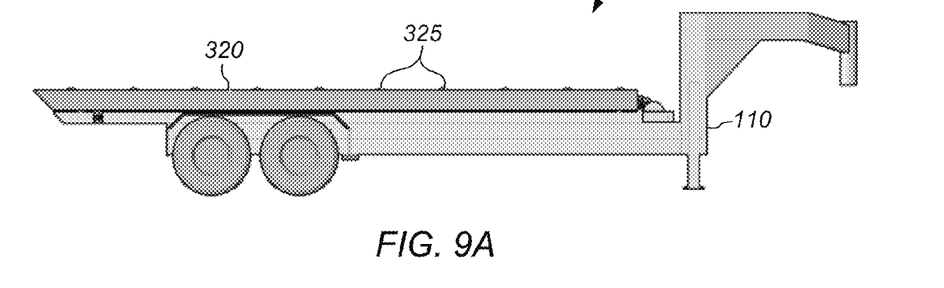
FIGS. 9A-B depict a diagram of a view of an embodiment of a convertible trailer system with an embodiment of a trailer attachment coupled to a trailer.
Figure 9B:
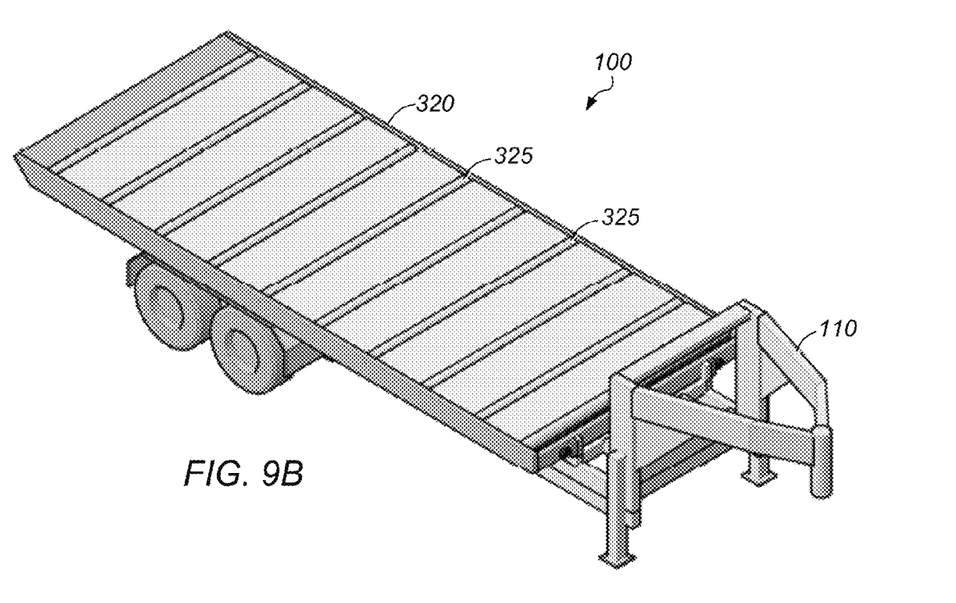
Figure 10:
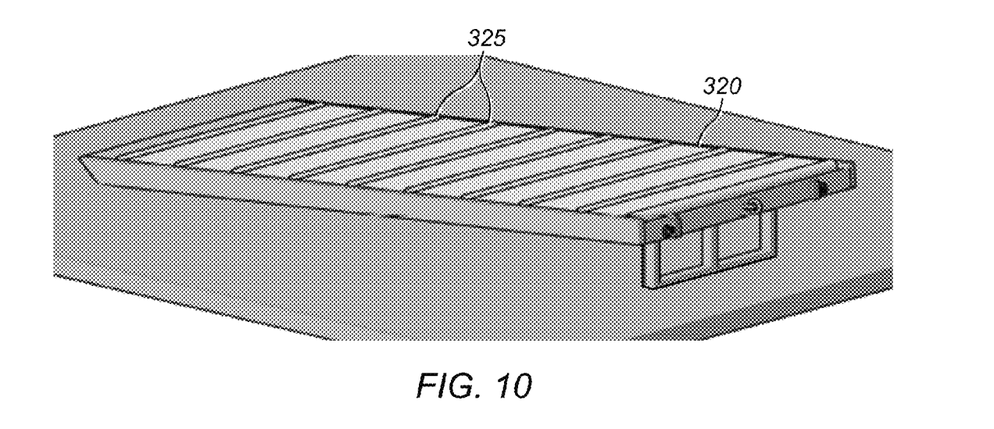
FIG. 10 depicts a diagram of a view of an embodiment of a trailer attachment which functions as a modified flatbed cargo transport.

FIGS. 9A-B depict a diagram of a view of an embodiment of convertible trailer system 100 with an embodiment of trailer attachment 320 coupled to trailer 110. FIG. 10 depicts a diagram of a view of an embodiment of trailer attachment 320 which functions as a modified flatbed cargo transport. Trailer attachment 320 may be modified with rollers 325. Rollers 325 may function to facilitate the loading and/or unloading of cargo onto and/or off the trailer attachment.

Figure 11A:
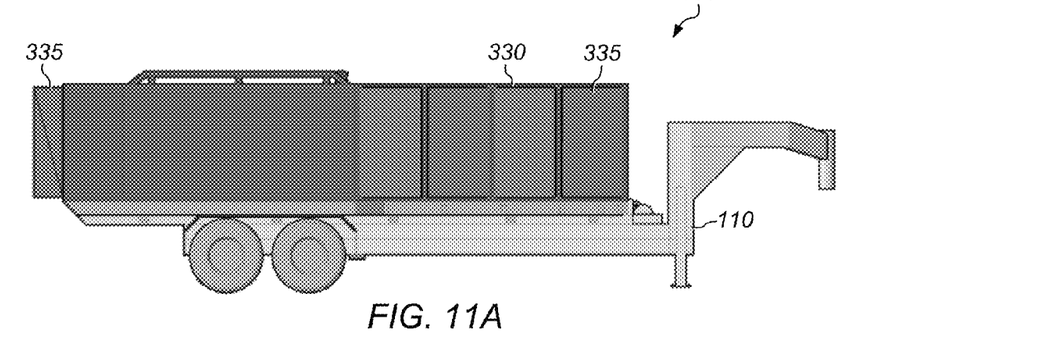
FIGS. 11A-B depict a diagram of a view of an embodiment of a convertible trailer system with an embodiment of a trailer attachment coupled to a trailer.
Figure 11B:
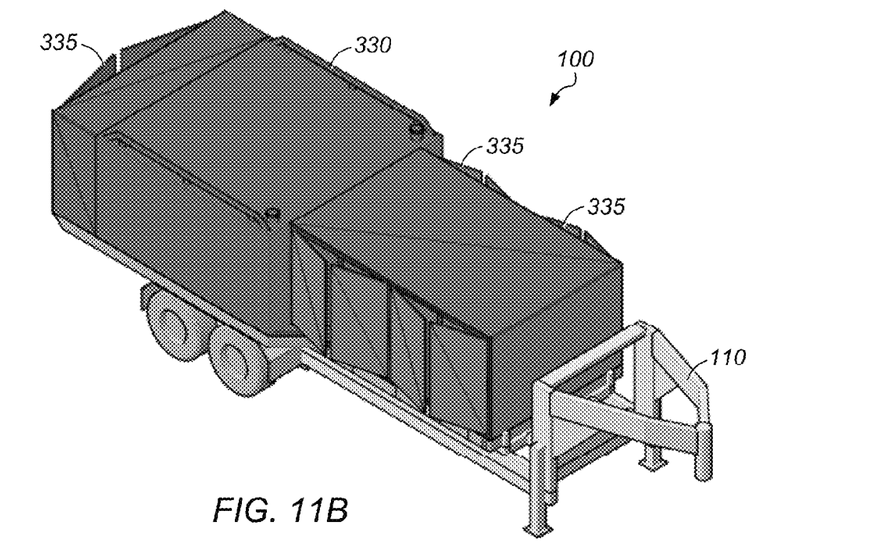
Figure 12:
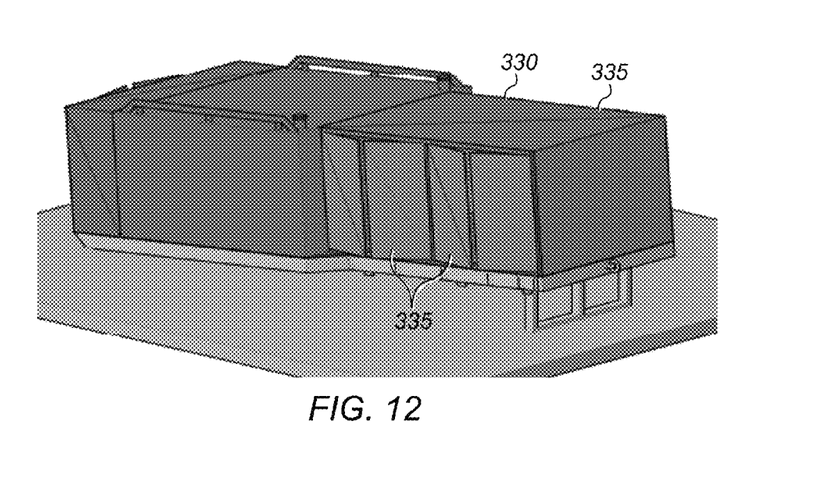
FIG. 12 depicts a diagram of a view of an embodiment of a trailer attachment which functions as a service workshop (e.g., fuel, lubes, welder, tools).

FIGS. 11A-B depict a diagram of a view of an embodiment of convertible trailer system 100 with an embodiment of trailer attachment 330 coupled to trailer 110. FIG. 12 depicts a diagram of a view of an embodiment of trailer attachment 330 which functions as a service workshop. In some embodiments, service workshop 330 may function as a portable tool storage system with multiple storage compartments 335. Trailer attachment 330 may be used to transport multiple collections and/or large tools, fuel, lubes, and/or a welder to a worksite and then unloaded from the trailer to be left behind for use.

Figure 13A:
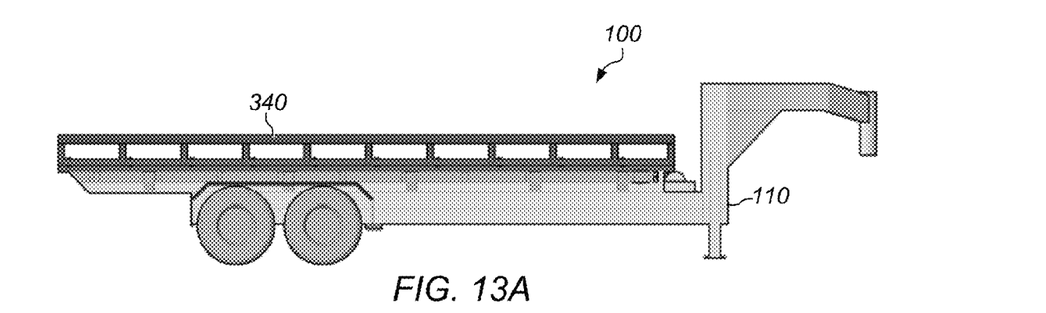
FIGS. 13A-B depict a diagram of a view of an embodiment of a convertible trailer system with an embodiment of a trailer attachment coupled to a trailer.
Figure 13B:
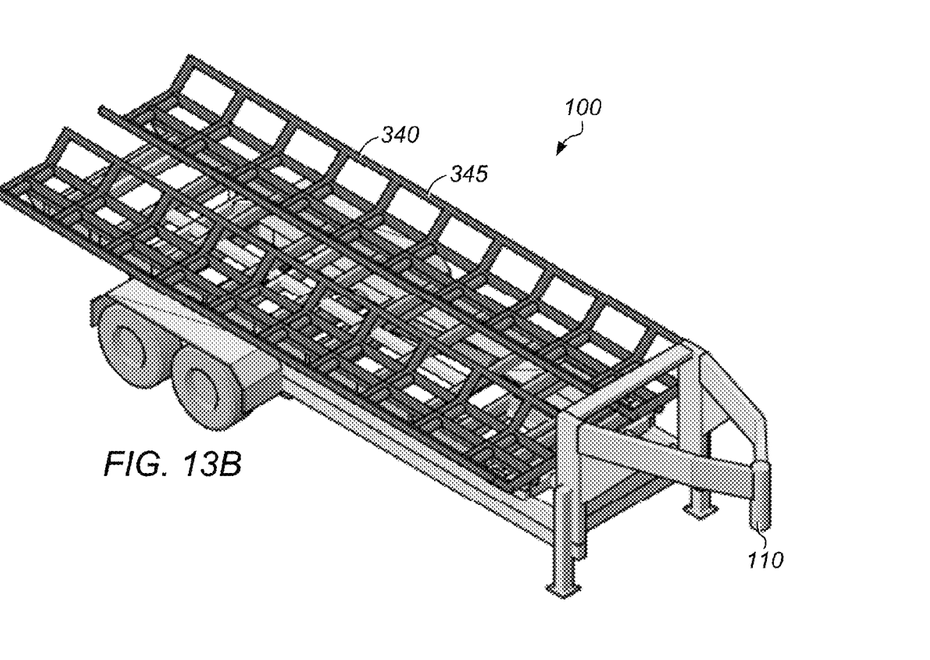
Figure 14:
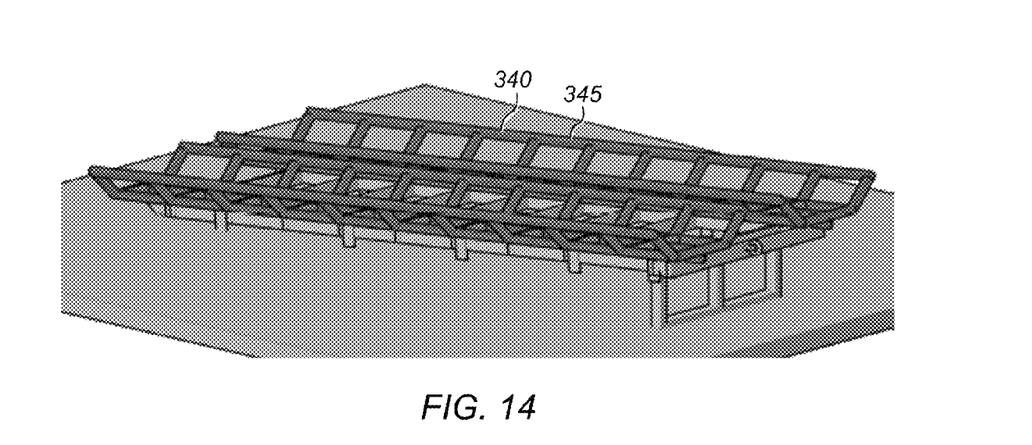
FIG. 14 depicts a diagram of a view of an embodiment of a trailer attachment which functions as a hay bale transport (e.g., multiple load and unloading of hay).

FIGS. 13A-B depict a diagram of a view of an embodiment of convertible trailer system 100 with an embodiment of trailer attachment 340 coupled to trailer 110. FIG. 14 depicts a diagram of a view of an embodiment of trailer attachment 340 which functions as a hay transport. Trailer attachment 340 may be used to transport different types of dried vegetation stock feed such as hay in one or more forms (e.g., free unbundled, bails, etc.) using racks 345. The trailer attachment may be used to transport hay to groupings of animals and in some cases may be left behind to provide a vessel for the livestock to feed from such that the hay is elevated off the ground to inhibit decomposition and waste. The trailer attachment may allow for providing (e.g., unloading) hay in an ordered arrangement.

Figure 15A:
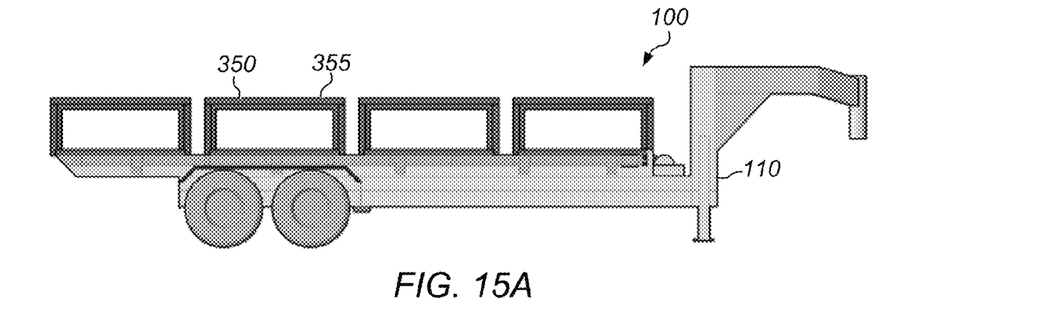
FIGS. 15A-B depict a diagram of a view of an embodiment of a convertible trailer system with an embodiment of a trailer attachment coupled to a trailer.
Figure 15B:
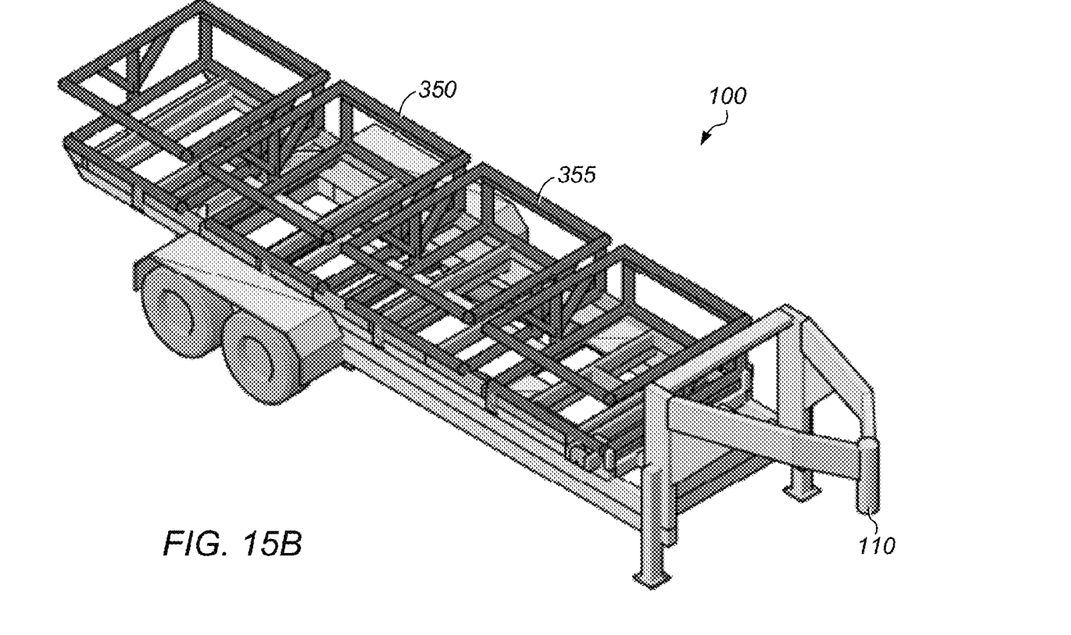
Figure 16:
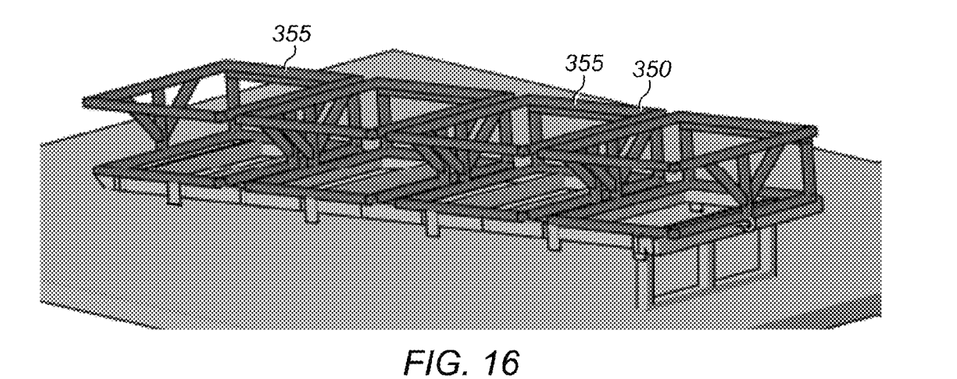
FIG. 16 depicts a diagram of a view of an embodiment of a trailer attachment which functions as a round hay bale transport (e.g., single load and unloading of hay).

FIGS. 15A-B depict a diagram of a view of an embodiment of convertible trailer system 100 with an embodiment of trailer attachment 350 coupled to trailer 110. FIG. 16 depicts a diagram of a view of an embodiment of trailer attachment 350 which functions as a hay bale transport. Trailer attachment 350 may be used to transport different types of dried vegetation stock feed such as hay in one or more forms (e.g., round bails, etc.) using racks 355. The trailer attachment may be used to transport hay to groupings of animals and in some embodiments may be left behind to provide a vessel for the livestock to feed from such that the hay is elevated off the ground to inhibit decomposition and waste. The trailer attachment may function to unload one or more large (e.g., round) bales at a time. Rack 355 may include a mechanism for unloading a bale(s) contained within the rack. The mechanism may include a spring loaded mechanism which when activated tilts the rack such that the hale is unloaded to the side of the trailer attachment.

In some embodiments, the first trailer attachment comprises a hay bale hauler/manure spreader, a livestock transporter, an enclosed building, a fertilizer spreader, a flatbed, a seed hopper, a cage system for garbage/waste, a multiple port-a-potty system, a roller frame, a corral system, a lubricant shop, oilfield tools or equipment, boat skid attachment, or a blank skid comprising a fuel cell (e.g., for generators, pumps, etc.) and mounting brackets.

Figure 17A:
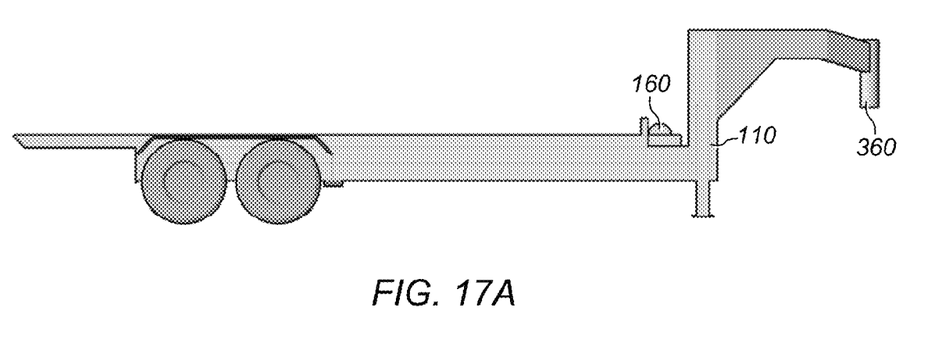
FIGS. 17A-B depict a diagram of a view of an embodiment of a trailer to which a trailer attachment may be coupled during use.
Figure 17B:
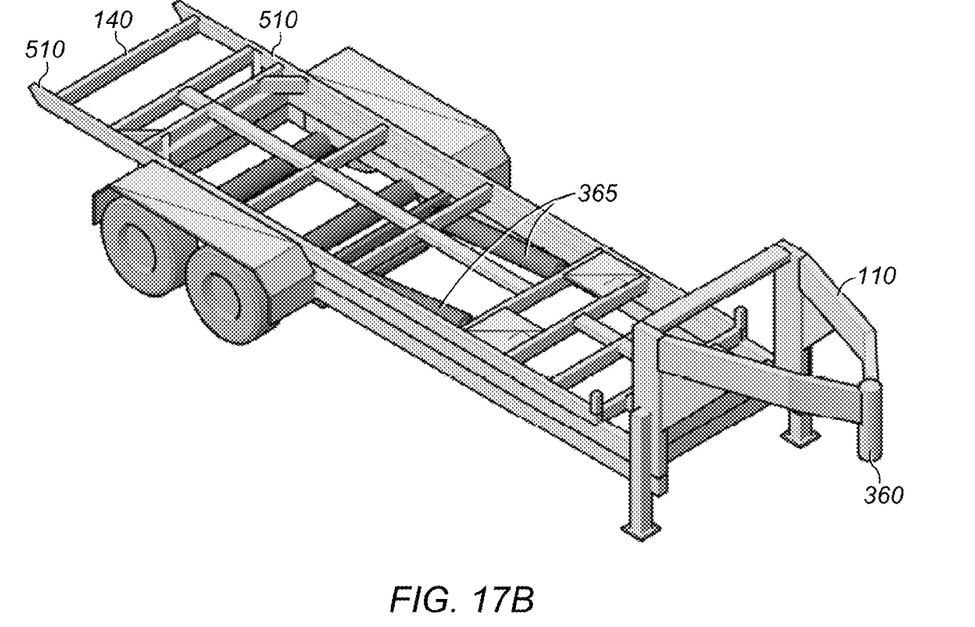
Figure 18A:
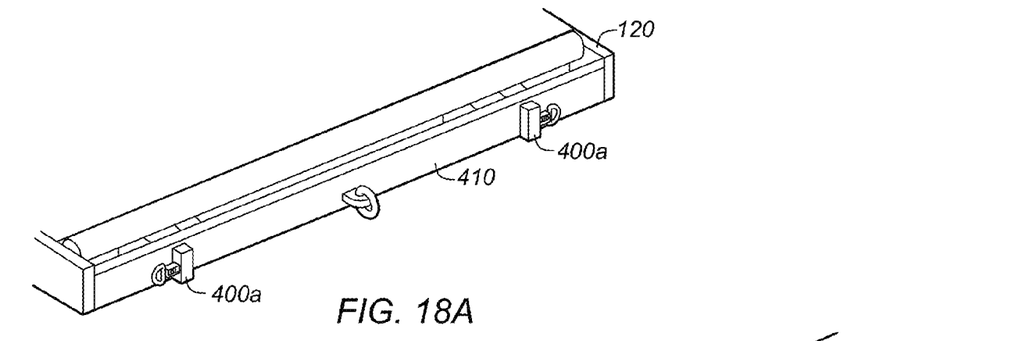
FIGS. 18A-D depict a diagram of a view of an embodiment of a coupling system for coupling trailer attachments to a trailer.
Figure 18B:
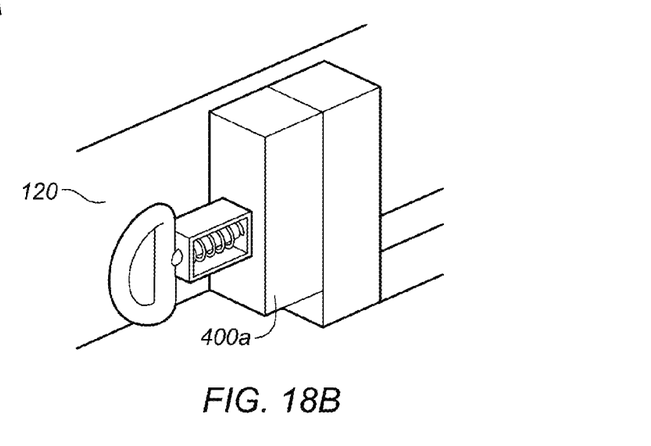
Figure 18C:
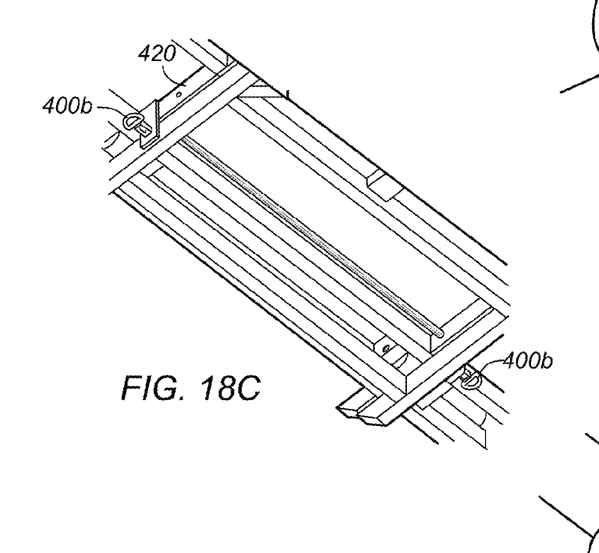
Figure 18D:
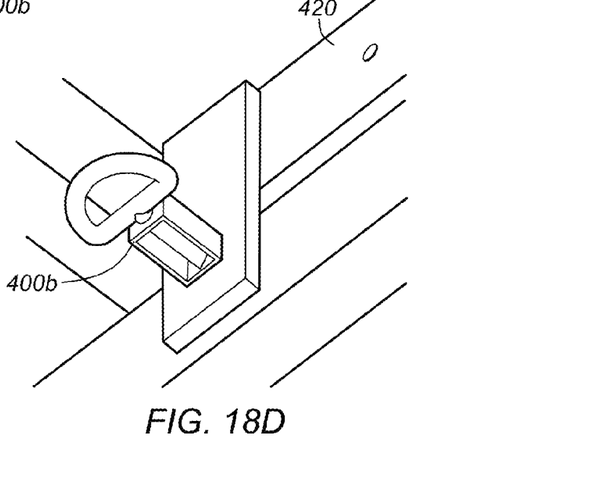

In some embodiments, the trailer itself may include trailer coupler 360 (e.g., a gooseneck attachment as depicted in FIGS. 17A-B) for coupling the trailer to a means (e.g., truck, or anything with appropriate towing power and an appropriate trailer hitch) for conveying the trailer to a destination.

FIGS. 17A-B depict a diagram of a view of an embodiment of trailer 110 to which a trailer attachment may be coupled during use. In some embodiments, trailer 110 may include loading system 160. Loading system 160 may couple to a first end of at least one of the trailer attachments and convey the trailer attachment from a first unloaded position to a second loaded position. The loading system may include a manual or a powered system, typically the system may include a powered system. A powered loading system may include an electric winch, hook lift system, or hooklift hoist system powerful enough to drag a trailer attachment from an unloaded to a loaded position. Such powered loading system may be used on trailers or commercial bobtail trucks that are equipped with either winches and/or hydraulic systems. In some embodiments, a powered unloading system may be may be used to unload a trailer attachment. The unloading system may include hydraulic cylinders 365. Hydraulic cylinders 365 may assist roll-off of goods and items on board the attachment utilizing gravity if the trailer attachment is uncoupled.

FIGS. 18A-D depict a diagram of a view of an embodiment of coupling system 400 for coupling trailer attachments 120 to trailer 110. The coupling system may couple during use either to the first trailer attachment or the second trailer attachment to the first side (i.e., the upper or top side) of the trailer.

In some embodiments, the coupling system may include at least two locking mechanisms 400*a* positioned at first end 410 of first trailer attachment 120 and at least two locking mechanisms 400*b* positioned adjacent second end 420 of the first trailer attachment. The second end may be positioned substantially opposite the first end.

In some embodiments, at least some of the locking mechanisms may be spring activated such that they are biased in a locked position or an unlocked position. At least some of the locking mechanisms may be spring activated such that they move, during use, from an unlocked position to a locked position when the first trailer attachment is in the loaded position. For example the locking mechanism may include a first portion mounted on a trailer attachment including an elongated member which engages an opening in a second portion of the locking mechanism mounted on a trailer. The elongated member may be operatively coupled to a spring which is biased to apply a force in a direction towards a locking position for the elongated member. In some embodiments, the elongated member may include a first engaging end with an angled cut which allows the elongated member to be repositioned as the engaging end engages the second portion and the spring then pushes the elongated member back into position through the opening once the engaging end reaches the opening in the second portion.

In some embodiments, loading system 160 may function as part of coupling system 400, such that the loading system assists in coupling trailer attachments 120 to trailer 110. For example an electric winch may be coupled to a trailer attachment during transport of the trailer attachment by the trailer. In this way the loading system may inhibit decoupling of the trailer attachment from the trailer, for example, during transport of the trailer attachment.

In some embodiments, the first surface of the first trailer attachment includes guide 500 (e.g., as depicted in FIG. 2). The guide may inhibit, during use, the first trailer attachment from moving in a lateral direction relative to the trailer. The guide may inhibit, during use, the first trailer attachment from moving in a lateral direction relative to the trailer during conveyance by the loading system and/or after the first trailer attachment has been loaded on the trailer. The guide may inhibit, during use, the first trailer attachment from moving in a lateral direction relative to the trailer such that that the guide forms at least a portion of the coupling system.

The guide may be proportioned such that it fits between two members 510 (e.g., as depicted in FIG. 17B) forming at least a portion of first side 140 of trailer 110. As the trailer attachment is loaded onto the first side of the trailer guide 500 is positioned between members 510 such that the members inhibit the guide (and subsequently the trailer attachment) from moving laterally with respect to the trailer.

In some embodiments, the guide includes a first end and a second end. The first end may be coupled to the first surface such that the second end rotates about the first end between a first position to a second position. The first position may be substantially orthogonal to the first surface (e.g., as depicted in FIG. 2). The second position may be substantially parallel to the first surface.

In some embodiments, the guide is predisposed to reside in the first position due to an applied first force. The applied first force may be provided by at least one spring or similar mechanism. The guide may move, during use, from the first position to the second position when an applied second force is provided which is greater than the applied first force. In some embodiments, the second force may be applied by the loading system as the trailer attachment is loaded on the trailer. During loading the guide may press against the end of the trailer applying enough force to move the guide from the first position to the second position such that the guide engages with the first side of the trailer.

In some embodiments, the guide is coupled adjacent to a first end of the first trailer attachment. A second end of the trailer may be oppositely positioned from the first end of the trailer. When the guide is in a first position the guide may elevate the first end relative to the second end of the first trailer attachment. When the guide is in a first position the guide may elevate the first end relative to a surface upon which the second end of the guide is positioned. When the guide is in a first position the guide may elevate the first end relative to a surface upon which the second end of the guide is positioned such that the first end of the first trailer attachment is positioned higher than the second end of the trailer. When an end is elevated, the elevation may facilitate easier loading and/or unloading utilizing gravity.

In some embodiments, the guide may include one or more stops (e.g., using a friction fit) which functions to inhibit (such that more force the guide from moving from either the first position and/or the second position. In some embodiments, the guide may include one or more locks which may be engaged in order stop the guide from moving such that the guide is locked in either the first and/or second position.

In some embodiments, elevating the first end of the trailer attachment may allow for the trailer attachment to be more easily loaded onto the trailer. In some embodiments, the trailer may include a roller mechanism (e.g., adjacent the second end of the trailer). The roller mechanism may assist in loading the trailer attachment on the trailer by reducing friction and as such requiring less power to load the trailer attachment (e.g., similar to rollers depicted in FIGS. 9A-B and 10). The trailer attachment may include one or more roller mechanisms on the underside of the trailer attachment, for example, at a first or second end of the trailer attachment (e.g., opposite of the jack or loading side there may be a roller system, wheels, or mechanism to assist trailer or automobile in loading attachment).

In some embodiments, elevating an end of the trailer attachment using the guide may allow for easier loading and unloading of cargo being transported by the trailer attachment.

In some embodiments, a method may include coupling a loading system of a trailer to a first end of a first trailer attachment and conveying the first trailer attachment from a first unloaded position to a second loaded position on the trailer. The trailer may include a first side, at least two wheels coupled to a second side, opposite the first, of the trailer, and a coupling system. The method may include coupling a first surface of the first trailer attachment to the first side of the trailer using the coupling system. The first trailer attachment may include a first function. The method may include decoupling and unloading the first surface of the first trailer attachment from the first side of the trailer. The method may include coupling the loading system of the trailer to a first end of a second trailer attachment and conveying the second trailer attachment from a first unloaded position to a second loaded position on the trailer. The method may include coupling a second surface of the second trailer attachment to the first side of the trailer using the coupling system. The second trailer attachment may include a second function. The first function and the second function may be different.

In some embodiments, a method may include inhibiting the first trailer attachment from moving in a lateral direction relative to the trailer using a guide coupled to the first surface of the first trailer attachment.

In some embodiments, a method may include applying a first force using an end of the trailer to a guide coupled to the first surface of the first trailer attachment such that a second end of the guide rotates about a first end of the guide between a first position to a second position. The first end may be coupled to the first surface of the first trailer attachment, and wherein the first position is substantially orthogonal to the first surface and the second position is substantially parallel to the first surface.

In some embodiments, the guide is coupled adjacent to a first end of the first trailer attachment. When the guide is in a first position the guide may elevate the first end relative to a second end of the first trailer attachment. The second end is oppositely positioned from the first end.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A convertible trailer system, comprising:
   a platform, comprising:
   a first side;
   at least two wheels coupled to a second side, opposite the first, of the platform;
   a loading system; and
   a coupling system;
   a first platform attachment, wherein the first platform attachment comprises a first surface which couples, during use, to the first side of the platform, wherein the first platform attachment comprises a first function, wherein the first surface of the first platform attachment comprises a guide, wherein the guide comprises a first end and a second end, wherein the first end is coupled to the first surface such that the second end rotates about the first end between a first position to a second position, wherein the guide is predisposed to reside in the first position due to an applied first force, and wherein the guide moves, during use, from the first position to the second position when an applied second force is provided which is greater than the applied first force;
   a second platform attachment, wherein the second platform attachment comprises a second surface which couples, during use, to the first side of the platform in, and wherein the second platform attachment comprises a second function;
   wherein the first function and the second function are different;
   wherein the loading system couples to a first end of the first platform attachment or the second platform attachment and conveys the platform attachment from a first unloaded position to a second loaded position; and
   wherein the coupling system couples during use either the first platform attachment or the second platform attachment to the first side of the platform.

2. The system of claim 1, wherein the guide inhibits, during use, the first platform attachment from moving in a lateral direction relative to the platform.

3. The system of claim 1, wherein the guide inhibits, during use, the first platform attachment from moving in a lateral direction relative to the platform during conveyance by the loading system.

4. The system of claim 1, wherein the guide inhibits, during use, the first platform attachment from moving in a lateral direction relative to the platform such that that the guide forms at least a portion of the coupling system.

5. The system of claim 1, wherein the first position of the second end of the guide is substantially orthogonal to the first surface and the second position is substantially parallel to the first surface.

6. The system of claim 1, wherein the guide is coupled adjacent to the first end of the first platform attachment, wherein when the guide is in a first position the guide elevates the first end relative to a second end of the first platform attachment, and wherein the second end is oppositely positioned from the first end.

7. The system of claim 1, wherein the guide is coupled adjacent to the first end of the first platform attachment, and wherein when the guide is in a first position the guide elevates the first end relative to a surface upon which the second end of the guide is positioned.

8. The system of claim 1, wherein the guide is coupled adjacent to the first end of the first platform attachment, and wherein when the guide is in a first position the guide elevates the first end relative to a surface upon which the second end of the guide is positioned such that the first end of the first platform attachment is positioned higher than an end of the platform.

9. The system of claim 1, wherein the applied first force is provided by at least one spring.

10. The system of claim 1, wherein the loading system comprises a powered and/or manual winch.

11. The system of claim 1, wherein the loading system comprises at least one hydraulic cylinder, winch, or hook lift system.

12. The system of claim 1, wherein the first platform attachment comprises a hay bale hauler, a livestock transporter, an enclosed building, a fertilizer spreader/manure spreader, a flatbed, a seed hopper, a cage system for garbage/waste, a multiple port-a-potty system, a roller frame, a corral system, a lubricant shop, a cylinder for liquid, oilfield tools or equipment, boat frame, or a blank skid, and wherein the blank skid comprises a fuel cell and mounting brackets.

13. The system of claim 1, wherein the coupling system comprises at least two locking mechanisms positioned at the first end of the first platform attachment and at least two locking mechanisms positioned adjacent a second end of the first platform attachment, wherein the second end is positioned substantially opposite the first end, wherein at least some of the locking mechanisms are biased in a locked position or an unlocked position.

14. The system of claim 1, wherein the coupling system comprises at least two locking mechanisms positioned at the first end of the first platform attachment and at least two locking mechanisms positioned adjacent a second end of the first platform attachment, wherein the second end is positioned substantially opposite the first end.

15. The system of claim 14, wherein at least some of the locking mechanisms are biased in a locked position or an unlocked position.

16. The system of claim 14, wherein at least some of the locking mechanisms are spring activated such that they move, during use, from an unlocked position to a locked position when the first platform attachment is in the loaded position.

* * * * *